UNITED STATES PATENT OFFICE.

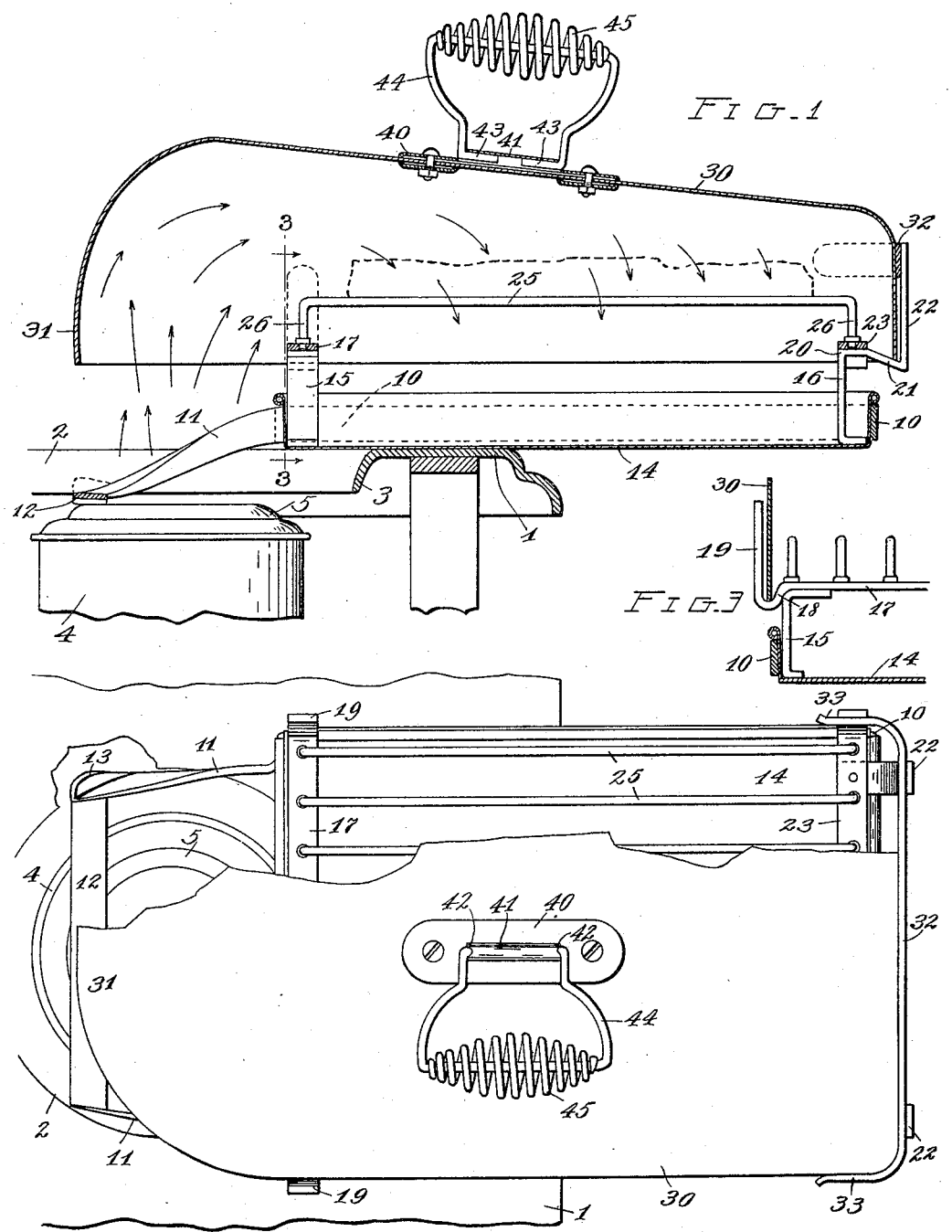

WILLIAM R. JEAVONS, OF CLEVELAND, OHIO.

BROILING DEVICE.

1,169,831.  Specification of Letters Patent.  Patented Feb. 1, 1916.

Application filed February 15, 1912. Serial No. 677,798.

*To all whom it may concern:*

Be it known that I, WILLIAM R. JEAVONS, a citizen of the United States, residing at Cleveland, in the county of Cuyahoga and State of Ohio, have invented a certain new and useful Improvement in Broiling Devices, of which the following is a full, clear, and exact description, reference being had to the accompanying drawings.

This invention relates to domestic cooking vessels and specifically to that class of cooking utensils known as broilers and used for the preparation of such portions of fish and flesh as require to be heated for a short time at a comparatively high temperature to effect their proper preparation.

The object of the invention is the provision of a device of this character which can be used with a gas stove or other heat source which is usually employed without a chimney connection and which, by submerging the viands in heated gases in a proper manner, will serve to cook the viands in a thorough and appetizing manner and without the production of smoke and odor; the provision of a device of this character which shall cook a slice of meat or fish thoroughly and evenly without the necessity of turning, basting, examining, or otherwise superintending the operation, and which will retain within the edible portion thereof all of the appetizing and healthful juices; and specifically to provide a device of this character which can be operated in conjunction with a heating source wherein is produced a sharply defined ascending column of heated gases and products of combustion, such as the stoves invented by me and disclosed in U. S. Letters Patent No. 848,828, issued April 2, 1907, while further objects and advantages will become apparent from the following description and claims.

The particular device shown herein is one which embodies the method and broad principles of operation set forth in my copending application filed on even date herewith, Serial Number 677,799 filed February 15, 1912.

Generally speaking my invention may be defined as consisting of the combinations of elements defined in the claims annexed hereto and illustrated in the drawings accompanying and forming a part hereof, wherein:

Figure 1 represents a vertical cross sectional view taken through a broiler made in accordance with my invention and illustrating a portion of a fluid-fuel burning stove for use in connection with which said broiler is peculiarly adapted; Fig. 2 is a plan view of the parts shown in Fig. 1, a portion of the broiler cover being broken away so as to show the grid, and a portion of the stove top being broken away so as to show the method of securing the broiler thereto; and Fig. 3 is a detail cross sectional view taken substantially along the broken line 3—3 of Fig. 1 and looking in the direction indicated by the arrows.

Describing the parts by reference characters, 1 indicates the top plate of a stove having therein a circular aperture 2 surrounded by a depending flange 3. Supported beneath said aperture and concentric therewith is an upright flue or chimney 4 having at its top an inwardly inclined constricting flange 5. A suitable fluid such as coal oil, alcohol, or gas being burned within or below this chimney, the products of combustion thereof together with highly heated air will ascend through this chimney in a rather sharply defined column as will be well understood by those skilled in the art, and, while heating appliances of this nature have been for a considerable time well known and widely used, no broiling device has been known which could be operated therewith, and it has been necessary to cook meats entirely by frying with the attendant disadvantages.

Generally described, my improved broiler comprises a hood or cap to overhang the upper end of this chimney so as to receive the heated gases discharged therefrom and to collect the same until it is entirely full, the bottom of said hood being substantially horizontal and preferably entirely open so that as the hood is filled the cooler gases are forced downwardly and flow outwardly from under the edge thereof, the action being exactly comparable to the overflowing of water from a bucket, but in an inverted manner. The meat to be cooked is supported upon a suitable frame work above the bottom edge of such hood and at one side of the column of heated gases, so as to be entirely "submerged" in the heated gases, melted fat and other drippings being received in a suitable pan also supported at one side of the heated column and kept relatively cool.

In the embodiment illustrated herein, this broiler comprises a metallic frame 10 of substantially rectangular shape, having at one end a pair of parallel forwardly extending and downwardly inclined arms 11—11 connected by a cross piece 12, the outer corners of the arms being bent upwardly as at 13. The length and inclination of these arms is such as to permit the frame portion to overhang the plate 1 of the stove in substantially a horizontal manner at the time when the portions 13 of these arms are hooked beneath the flange 3, the position of the cross piece being such as to cause it to fall outside of the limits of the heated column. A rectangular tray or drip-pan 14 is received within the frame 10 and securely held thereby and carries uprights 15, 16 by which the grid and hood are supported.

The uprights 15 are secured at the forward end of the tray and have secured to their upper ends a cross bar 17, the outer ends whereof are first bent downwardly, as at 18, and then upwardly, as at 19, (see Fig. 3) so as to form a notch or groove substantially above the sides of the frame 10. The standards 16 are here shown as bent horizontally at 20, thence downwardly, as at 21, and then upwardly, as at 22, so as to form a kind of notch substantially above the end of the pan 14. The portions 20 of these standards are then connected together by a cross bar 23 similar to and parallel with the cross bar 17. Obviously the bracket 16 can be made like the bracket 15, but the construction illustrated is found to be preferable for practical reasons. A plurality of parallel rods 25 extend between and are connected to these bars, each of these rods having downwardly turned ends 26 secured to the bars in any convenient manner, as by riveting or brazing, so that the main portions of these rods will be elevated considerably above the cross bars.

To cover the grid and tray a hood 30 is provided, said hood comprising an oblong sheet metal member having parallel sides adapted to enter the grooves or notches between the portions 18 and 19 of the cross bar 17, and having an end adapted to enter the similar notches defined by the portions 21 and 22 of the standards 16. The forward end of the hood is extended as at 31 so as to include the area defined by the column of heated gases rising from the chimney 4, and the top of the hood is formed as a long slanting plate having its greatest height immediately above this chimney. The upwardly bent portions 22 of the standards 16 are preferably connected by means of a horizontal metal strap 32, the ends whereof are bent forwardly as at 33 and slightly outturned so as to receive the rear end of the hood, while the portions 21 of these standards instead of being bent abruptly downward are formed on a comparatively long incline, so that the end of the hood may thereby be urged against the strap 32, and rattling between these parts be prevented.

Secured to the top of the hood 30 is a metallic strap 40 preferably having a narrow elongated portion 41 struck upwardly therefrom so as to form a kind of stirrup. The ends of this stirrup are formed with vertical notches 42, 42, and into the ends of this stirrup are inserted the alined extremities 43, 43 of a D-shaped handle-wire 44, the straight side of the wire being provided with a spiral wire handle 45 or other suitable non-heat conducting hand-grip. The elasticity of the handle-wire 44 is such that the ends thereof tend to approach each other more closely than the length of the stirrup 41 will permit, thus enabling the handle to be supported in an upright position by the notches 42 when moved to such position, as shown in Fig. 1, and to be supported in a downwardly folded position when desired, as shown in Fig. 2.

This construction provides a hood having an open bottom the lower edge of which is substantially horizontal, as shown in Fig. 1, the forward portion of the hood being extended forwardly so as to catch the gases rising from the chimney 4, together with a grid supported within said hood and spaced above the bottom edge thereof at one side of the chimney 4 and a pan or drip tray below said grid. This construction results in the filling of the hood and the submergence of the viands with heated gases discharged by the chimney 4, the hottest of the gases being in the upper portion of the hood by reason of their smaller density and the cooler gases, as they give up their heat to the walls of the hood and the viands on the grid, gravitating to and being discharged around the edge of the hood. The result is that a piece of meat placed on the grid will be cooked with absolute uniformity and without any scorching or burning, the fat, tallow, and other oily substances being melted and falling into the pan 14, but the meat juices being all retained within the edible parts thereof. The tray 14 being comparatively cool, the fat dropping thereon will evolve no smoke and practically no odor.

While I have described my invention as a broiler, it will be obvious that it can be employed, with slight alterations in design, for cooking cereals, gruels, stews, soups, and other articles of food which it is desired to maintain at a substantially uniform temperature without danger of burning or overheating. Furthermore, while I have described the device as employed with a particular kind of heat source, it is obvious that it could be employed with other type of stoves, such as the usual type of gas burner, the article to be cooked being submerged within the gases from above, the food being supported out of the direct upward draft of such gases, as indicated in Fig. 1. Lastly, while I have necessarily described the invention in detail and pointed out at length the features of construction which I prefer to use and which my experience shows to be most advantageous, it will be obvious that many changes in such construction can be made without departing from the spirit of my invention and without sacrificing the advantages thereof, so I do not propose to be limited by such details except as the same may be definitely included in the claims hereto annexed or may be rendered necessary by the prior state of the art.

Having thus described my invention, what I claim is:

1. In a broiler, the combination of a substantially horizontal food supporting table or grid, a gas retaining hood having a closed top and depending sides, said sides being formed to permit the escape of heated gases and an end of said hood being extended so as to receive at one end of said food supporting table or grid the column of heated gases arising from a suitable source of heat, means carried by said table or grid for supporting said hood with its gas escape portions at a lower level than the upper surface of said table or grid, and a drip pan below such table or grid and at a lower level than said escape portions.

2. In a broiler, the combination of a substantially horizontal food support having supporting members connected to the food support and provided with seats for a hood located at a lower level than the top of the food support, a hood having a closed top and sides and a substantially horizontal lower edge adapted to rest upon the seats, an end of said hood being extended so as to receive at one side of the food support the column of heated gases arising from a suitable source of heat, and a drip pan below the food support and below the lower edge of the hood.

3. In a broiler, in combination, a metallic frame having forwardly extending downwardly inclined arms adapted to enter an aperture in a stove top, the ends of said arms being formed with hooked portions adapted to engage the sides of said aperture, a drip pan carried by said frame, a grid mounted above said frame, a hood supported above said grid and having dependent sides inclosing the grid, the lower edges of said hood being substantially horizontal and located below said grid and the forward end of said hood being extended so as to overhang the aperture in said stove plate.

4. In a broiler, in combination, a metallic frame having forwardly extending downwardly inclined arms adapted to enter an aperture in a stove top, the ends of said arms being formed with hooked portions adapted to engage the sides of said aperture, a drip pan carried by said frame, a grid mounted above said frame, a hood supported above said grid and having dependent sides inclosing the grid, the lower edge of said hood being substantially horizontal and located below said grid, and the forward end of said hood being extended so as to overhang the aperture in said stove plate, the top of said hood being inclined and having its highest portion above said aperture.

5. In a broiler, the combination of a grid, a pair of downwardly inclined arms adapted to enter an aperture in a stove top and provided with projections adapted to engage the sides of said aperture, a drip pan beneath the grid and having its bottom above the projections of the arms so as to rest on the stove top when the projections are so engaged with the sides of the aperture, and a hood above the grid and having its lower edge below the grid and above the drip pan and having an extension adapted to overhang the aperture in the stove top to receive the heated gases discharged through such aperture.

6. In a broiler, the combination of a grid, a hood above the grid and having its lower edge extending below the grid, a drip pan beneath the grid and located below the lower edge of the hood, and a pair of arms extending downwardly and adapted to enter an aperture in a stove top and provided with projections adapted to engage opposite sides of such aperture, the said projections and drip pan being so arranged that the drip pan will rest upon and be supported in a substantially horizontal position by the stove top while the projections are so engaged.

7. A broiling attachment comprising in combination a hood, having an outlet for heated air and gases, a substantially horizontal food supporting table or grid supported with its upper surface as high as such outlet, said hood having a portion adapted to extend above the column of heated gases arising from a suitable source of heat, and a drip pan located below the table or grid and at a lower level than said outlet.

8. A broiling attachment comprising in combination a hood having a closed top and depending sides, the sides being provided with an outlet extending substantially therearound for the escape of heated gases which may collect within the hood, a substantially horizontal food supporting table or grid having its upper or food supporting surface as high as the outlet, and a drip pan below said table or grid and located below said outlet, said hood having a portion adapted to extend above the column of heated gases arising from a suitable source of heat.

In testimony whereof, I hereunto affix my signature in the presence of two witnesses.

WILLIAM R. JEAVONS.

Witnesses:
J. B. HULL,
BRENNAN B. WEST.